Sept. 18, 1962     D. CRAIG ET AL     3,054,825
METHOD OF PRODUCING VANILLIN AND OTHER USEFUL PRODUCTS
Filed Aug. 22, 1958     3 Sheets-Sheet 2

INVENTORS
D. CRAIG &
C.D. LOGAN
BY
PATENT AGENT

Sept. 18, 1962  D. CRAIG ETAL  3,054,825
METHOD OF PRODUCING VANILLIN AND OTHER USEFUL PRODUCTS
Filed Aug. 22, 1958  3 Sheets-Sheet 3

INVENTORS
D. CRAIG &
C. D. LOGAN
BY
PATENT AGENT

United States Patent Office 3,054,825
Patented Sept. 18, 1962

3,054,825
METHOD OF PRODUCING VANILLIN AND OTHER USEFUL PRODUCTS
David Craig and Charles D. Logan, St. Catharines, Ontario, Canada, assignors to The Ontario Paper Company Limited, Township of Thorold, Ontario, Canada
Filed Aug. 22, 1958, Ser. No. 756,612
4 Claims. (Cl. 260—600)

This invention relates to the production of useful materials, including vanillin, acetovanillone, lignin substance, calcium oxalate and sodium values from the sludge constituting the solid phase from processes for producing oxidation products from lignosulfonic acid compounds, such, for example, as those described and claimed in U.S. Patents Numbers 2,576,752 and 2,576,753 issued November 27, 1951, to Fisher and Marshall and Number 2,576,754 issued on the same day to Fisher and Sankey. Such solid phase or sludge is somewhat variable in composition but its principal constituents are residual lignin, calcium carbonate, calcium sulphate and calcium oxalate together with residual free slaked lime and such vanillin product and co-products as are adsorbed or occluded therewith.

In U.S. Patent 2,576,752 there is clearly set out (col. 5/12 ff.) a characteristic of the production of vanillin and other compounds from waste sulphite liquor by controlled alkaline oxidation in the presence of lime as an active alkali, namely, that in the liquor as discharged from the reactor both liquid and solid phases are present, the latter constituting a sludge, that there is a distribution of vanillin and various co-products between the liquid phase and the sludge, that the materials associated with the sludge are much more difficult to recover than those present in the liquid phase and that in order to assure that an optimum proportion of vanillin substance be retained in the liquid phase it is a preferred practice according to the invention of U.S. Patent 2,576,752 that the liquid phase and the sludge of the reactor discharge be separated prior to acidification to release free vanillin therefrom. In fact it was even stated that in the commercial practice according to the invention of the said U.S. patent it might be economically advantageous to discard the sludge and only recover that portion of the vanillin substance which was present in the liquid phase.

We have, however, discovered that this sludge, containing as it does certain useful products, can be so treated as to make it possible to obtain those useful products on an economic basis.

As pointed out by Fisher and Marshall in U.S. Patent 2,576,752 (col. 5/38–43) this sludge contains the great mass of reaction products other than vanillin, acetovanillone and certain related derivatives. Thus, it holds inorganic materials (principally calcium sulphate, calcium oxalate, calcium carbonate) and ligneous residues chiefly in the form of their calcium salts or derivatives. We have now discovered a method whereby these materials may be obtained from the sludge. Our invention thus constitutes an improvement on the processes described and claimed in the aforementioned patents and further provides a means of obtaining useful materials from processes using lignosulfonic compounds as starting materials as hereinafter described.

Our invention thus consists in so treating the said sludge as to obtain therefrom one or more of the following useful products, namely, calcium carbonate, vanillin, acetovanillone, lignin substance and calcium oxalate and, further, to recover sodium values from the reactants which we employ.

In the accompanying drawings which illustrate the practice of our invention:

We have discovered that when the aforementioned sludge is leached with an aqueous solution of sodium carbonate, preferably at a temperature of the order of 70° or higher, its constituents are substantially dissolved with the exception of calcium carbonate. In general the solution is in the form of the corresponding sodium derivatives or salts and equivalent formation of additional calcium carbonate takes place. The quantity of sodium carbonate required to effect such leaching may be reduced if an aqueous suspension of the sludge is gassed with carbon dioxide either prior to or during the treatment with sodium carbonate. The carbon dioxide reacts with the free lime present in the sludge converting this to calcium carbonate.

Figure 1:
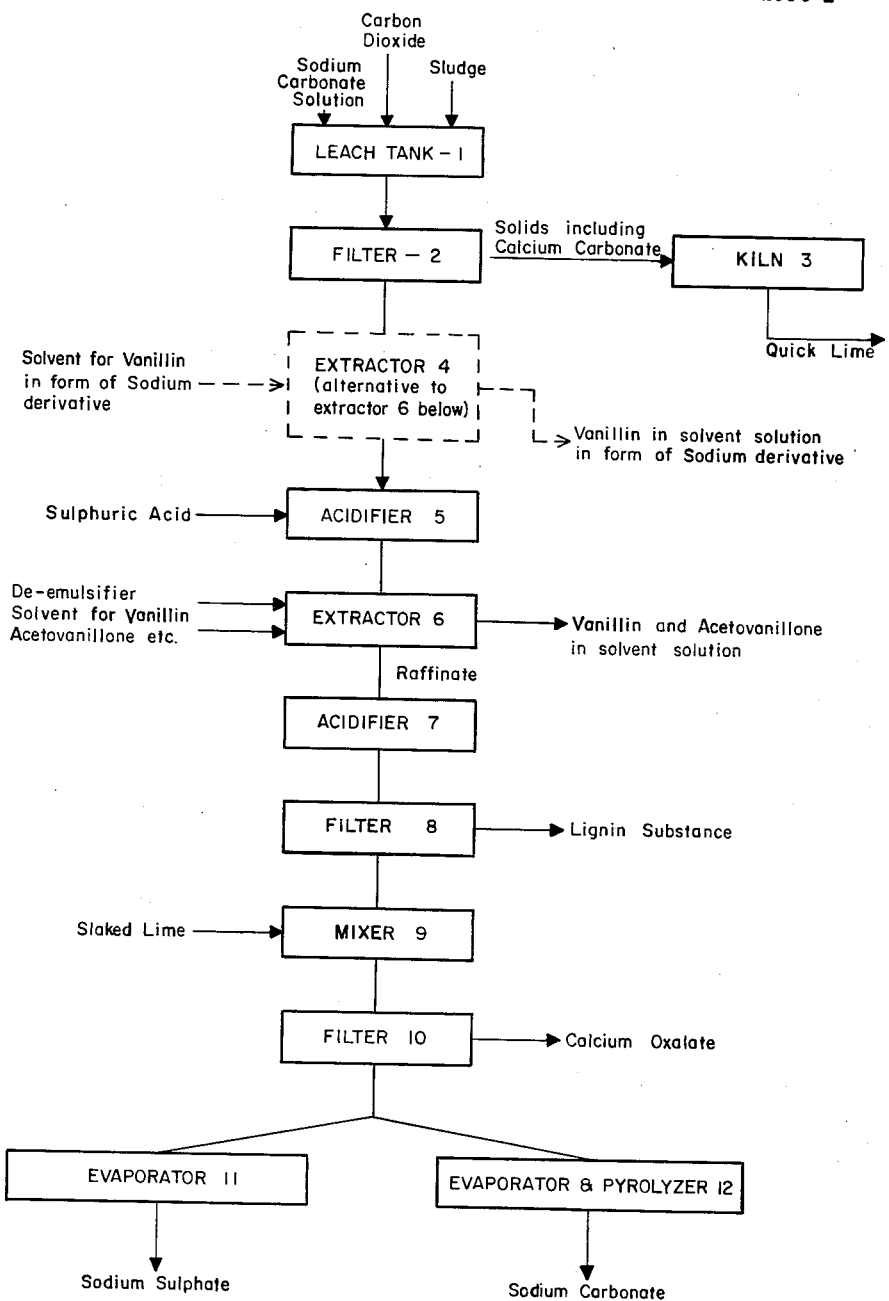
FIG. 1 is a diagrammatic flow sheet indicating generally the step in our process.

Useful and valuable products can then be obtained by means of the process generally indicated in the diagrammatic flow sheet, FIG. 1. Thus the calcium carbonate can be separated by filtration, taken to a lime kiln and converted to quick lime which may be cycled back for use as active alkali, in the treatment of lignosulfonic acid compounds according to the method of U.S. Patent 2,576,752 above mentioned or for other uses. The filtrate may be acidified, for example, by sulphuric acid sufficient to release free vanillin in solution from the form of its sodium derivative after which the vanillin may be extracted by solvents such as benzene, toluene, etc., as is well known, or alternately the acidification step may be omitted and the vanillin extracted in the form of its sodium derivative according to such processes as are described in U.S. Patent 2,104,701, Sandborn; U.S. Patent 2,399,607, Servis; U.S. Patent 2,489,200, Sankey and Marshall; U.S. Patent 2,721,221, Bryan. After extraction of vanillin substance the raffinate may be acidified further to a pH of approximately 4, thereby precipitating lignin substance. This lignin substance results from the oxidation and desulphonation effected in the presence of lime as an active alkali according to U.S. Patent 2,576,752. This lignin substance may be removed by filtration and converted to a soluble form, for example, that of its sodium salt, which may be employed as a dispersant. The filtrate, after removal of lignin substance, may be treated with controlled amounts of lime to precipitate calcium oxalate, which can in turn be removed by filtration. The calcium oxalate may then be converted to oxalic acid. Finally, substantial sodium values are present in the filtrate residual from the separation of calcium oxalate and they may be recovered, for example, by evaporation and crystallization in the form of sodium sulphate. Alternately, the residual liquor may be evaporated and pyrolized to recover sodium values in the form of sodium carbonate. As an example of a technique which may be applied for this purpose reference is made to "Chemical Recovery From Neutral Sulphate Semi-Chemical Spent Liquors by the Atomized Suspension Technique," Lee and Gauvin, TAPPI, Volume 41, pp. 110 116, March 1958, and to Canadian Patent 552,789, Gauvin, February 4, 1958. In the alternative other known methods of converting sodium sulphate to sodium carbonate may be employed. Such methods have, for example, been described by Haywood, "Possible Processes for Recovering Soda and Sulphur From Semichemical and Acid Sulphite Wash Liquors," TAPPI, Vol. 37, No. 2, pp. 134A–136A and in U.S. Patent 2,788,273, Shick, issued April 9, 1957.

If sodium values are recovered in the form of sodium carbonate the latter may be employed to leach additional sludge according to the process of the instant invention.

The following is illustrative of the application of our invention:

Example 1

Lignosulfonic acid materials were treated according to the process of U.S. Patent 2,576,754. The reactants were filtered and a quantity of the filter cake or sludge containing 400 grams dry solids was slurried in water to give a 20% suspension, i.e. 400 grams dry solids in a total volume of 2 litres. This suspension was carbonated with $CO_2$ gas to a pH slightly over 10 to neutralize excess lime after which a 20% aqueous solution of sodium carbonate was added (0.38 gram sodium carbonate per gram sludge solids) and the mixture stirred for one hour at about 80° C. The resultant slurry was then filtered to remove 332 grams of a light tan coloured material comprising chiefly calcium carbonate. After separation the latter was calcined to produce a quick lime, which, on test, contained 86% available lime. This lime was of satisfactory quality for use according to the processes of U.S. Patents 2,576,-752, 2,576,753 and 2,576,754. The filtrate after removal of the carbonate was diluted with water equal to 35% of its volume, acidified to pH 6 with sulphuric acid and extracted with toluene. 2.1 grams of vanillin were subsequently recovered from the toluene extract. In the course of the extraction of vanillin some difficulty was encountered with emulsions. This was eliminated by the addition of a small amount of a surface active agent as a de-emulsifier (Oronite wetting agent "S," manufactured by Oronite Chemical Company). Following extraction of the vanillin the toluene residual in the liquor was removed by stripping, about 5% of the liquor being evaporated. The residual liquor was acidified with sulphuric acid to pH 4. A precipitate of lignin substance formed which precipitate was removed by filtration and amounted to 94 grams equivalent dry weight. The filtrate residual after lignin separation was treated with sufficient slaked lime to precipitate its oxalate content in the form of calcium oxalate. This precipitate was also filtered and amounted to 36 grams equivalent dry substance. The residual liquor after removal of the calcium oxalate was evaporated to dryness and gave a residual containing about 180 grams of a mixture of sodium sulphate and sodium bisulphate.

In numerous other experiments which we have run the advantage of certain steps became apparent and become preferred embodiments of our invention. The preferred amount of sodium carbonate used in the leaching step is that equivalent to the calcium content of the calcium compounds except calcium carbonate present in the said sludge. Reference was made in the example above of the conversion of free lime to calcium carbonate, the object of such conversion being to reduce the requirements of sodium carbonate. If excess sodium carbonate is used this will require additional acid but is eventually capable of recovery in terms of sodium values. If too little sodium carbonate is used incomplete leaching of the soluble portion of the sludge results. Contamination of the calcium carbonate solids residual from the leaching with calcium sulphate and other calcium compounds will follow, introducing filtering difficulties, and in addition the yields of other valuable materials, e.g. lignin, oxalate, and sodium sulphate, will be correspondingly reduced. Under these conditions we have also found that there is an increased tendency for the vanillin to be absorbed on the lignin substance, making its separation and removal more difficult.

In Example 1, we employed Oronite Wetting Agent "S" as a suitable surface active agent during the step of vanillin extraction. We have also found that the following surface active agents may be satisfactorily employed: Tetraprene AS, Canadian Aniline & Extract Co. Ltd.; Parnol 85, Jacques Wolf & Co.; Nacconol NR, National Aniline Div., Allied Chemical & Dye Corp.; Monosulph, Nopco Chemical Co.; Kreelon 4G, Wyandotte Chemical Corporation; Kaywet #40, Kraft Chemical Co. Inc.; Solvadine G, Ciba Co. Inc.

It is well known that the efficiency of any given surface active agent to reduce, limit or prevent emulsion formation depends upon the physico-chemical properties of the materials present, and such conditions as temperature. The selection of such an agent for a particular given purpose must therefore be determined by experiment. We have ascertained that the surface active agents listed above are suitable for use according to our invention. It will be noted that the agents listed are all in the general class of alkyl-aryl sulfonates which, therefore, appear generally, but not necessarily invariably, suitable for use. The selection of other suitable agents can be readily determined experimentally by anyone skilled in the art.

When, therefore, in the specification and claims we refer to a de-emulsifying agent or to a surface active agent as a de-emulsifier we refer to and mean a material selected from the class comprising the surface active agents listed above and other surface active materials which perform the same function under the conditions according to the practice of our invention.

We have also found that the lignin substance is most easily separated by filtration when it is precipitated at a temperature in the range 40° C.–70° C. Coagulation occurs more readily the higher the temperature in this range but if the lignin is heated at too high a temperature or for too long a time it tends to fuse producing a material in a form which is difficult to remove. The precise maximum temperature at which this occurs varies somewhat and in general we prefer to precipitate the lignin at a temperature of approximately 60° C. We have occasionally encountered undesirable fusion of lignin substance between 60° C. and 70° C. consequent upon variations in the composition of the starting material.

If it is desired in the recovery of sodium values to recover the sodium in the form of sodium sulphate rather than as a mixture of sodium sulphate and sodium bisulphate the liquor prior to evaporation must be neutralized to a condition of higher alkalinity than pH 4. Adjustment to pH 7 prior to evaporation is preferred. An additional reason for such adjustment of acidity prior to evaporation is that if the material is evaporated at pH 4, as in Example 1, the sulphate tends to be contaminated with lignin substance which has remained in the liquor, i.e., was not precipitated in the preceding step. At the higher pH the sodium salt of lignin is very soluble and such residual lignin as is present tends to remain in the mother liquor from which the sodium sulphate separates.

When the solid phase produced according to the processes of U.S. Patents 2,576,752, 2,576,753 and 2,576,754 is treated with sodium carbonate the residual solids (principally calcium carbonate) not leached out by the sodium carbonate solution are extremely difficult to filter. We have discovered that the filtration rates of this residual solid can be greatly improved by subjecting the slurry to superatmospheric pressure and passing through it a gas containing free oxygen in finely dispersed form. The temperature at which this operation is conducted should be in the range between 120° C. and 200° C. and we prefer to carry it out at a temperature above 140° C. Furthermore, under such oxidation conditions a portion of the residual lignin substance present in the sludge is converted to vanillin and other co-products including acetovanillone. It will be understood that this vanillin and co-products are additional to the vanillin and co-products content adsorbed or occluded with the sludge resultant from the process of U.S. Patents 2,576,752, 2,576,753 and 2,576,754. In order to effect this oxidation of lignin substance present in the sludge additional alkali is required. Accordingly we add lime to the mixture prior to such oxidation step or in the alternative, in conducting the alkaline oxidation of lignosulfonic acid materials in accordance with the process of U.S. Patents 2,576,752, 2,576,753 and 2,576,754 we may provide additional lime over and above that required which excess lime will be carried through the said process to the sludge and in consequence will be present when required according to the process of the instant invention. Additional sodium carbonate is also required. In view of the necessity of maintaining adequate alkalinity the preferred step of treating an aqueous slurry of the sludge with carbon dioxide gas prior to treatment with sodium carbonate solution will, of course, be undesirable according to this modification of our invention and is to be omitted.

It is undesirable that calcium compounds other than calcium carbonate be present in the solid phase residual from the oxidative step in the present process. It is preferred that the amount of lime added prior to such oxidative step should be limited so that no such calcium compounds are so present. The presence of calcium compounds other than calcium carbonate in the reactants following the oxidative step is readily apparent because when such compounds are present the solid phase discharged from the reaction zone is typically of a light tan colour rather than white or gray. The difficult filtering characteristic of such solid phase is also an almost certain sign of such compounds. If too large a quantity of lime has been added resulting in the undesirable condition noted above this may be corrected by treating the materials discharged from the reaction zone with carbon doxide gas at a pH of 12 or greater or alternately by adding additional sodium carbonate to the said materials after their discharge from the reaction zone.

The quantity of lime which should be employed is related to the amount of sodium carbonate present. Sodium carbonate is first required as noted above in an amount equivalent to the calcium content of the sludge reduced by the amount of calcium present in the form of calcium carbonate in the said sludge. Additional alkali then has to be present sufficient to maintain adequate alkalinity during the oxidative step which adequate alkalinity we have determined as being that of pH 12 or greater determined on a sample removed from the reaction zone and cooled to room temperature. Such additional alkali is provided in accordance with our invention by sodium carbonate and lime. The amount of lime used should, therefore, not exceed that equivalent to the quantity of sodium carbonate present over and above that required to leach the sludge as hereinabove described. Actually in practice some excess lime over the above amount can be usefully employed because during the oxidative step some of the materials in the reaction zone are oxidized to carbon dioxide which in turn reacts with the free lime present to produce calcium carbonate. The use of an amount of lime in accordance with the above criteria permits the satisfactory operation of the process according to our invention. If the amount of lime is limited to that equivalent to the amount of sodium carbonate added in excess of that required for the leaching operation as hereinbefore described no difficulties due to the presence in the solid phase of calcium compounds other than calcium carbonate will be encountered.

As a general guide to the amount of lime to be used reference may also be made to the various examples given herein. Under the conditions of the experiments described the presence of calcium compounds other than calcium carbonate in the solid phase residual from the oxidative step was in every case avoided.

Figure 2:
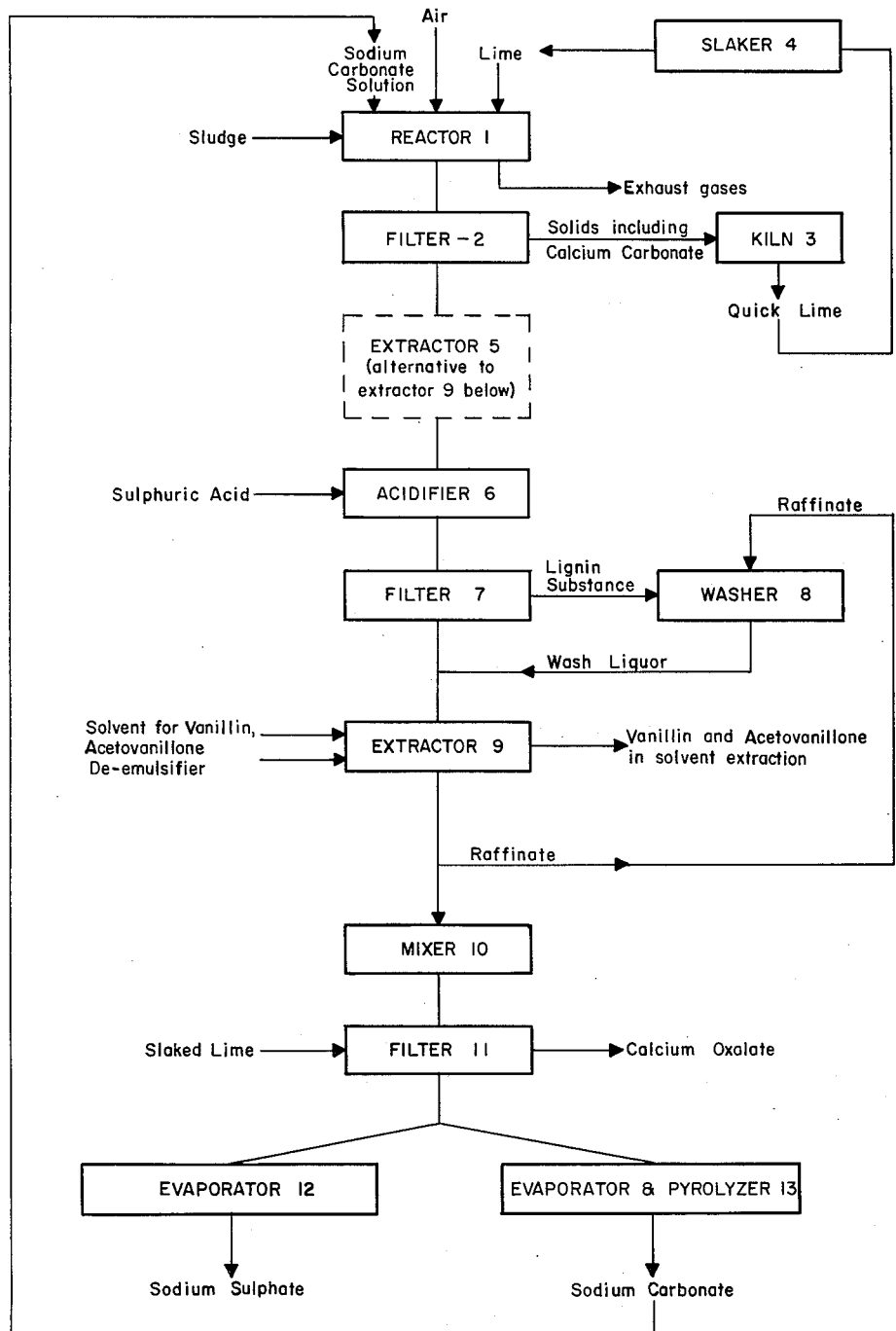
FIG. 2 is a diagrammatic flow sheet showing steps additional to those shown in FIG. 1, and constituting a preferred embodiment of our invention.

After the oxidative step is completed the various useful products can be isolated in general according to the method shown in the diagrammatic flow sheet of FIG. 2. The separation of calcium carbonate can be effected much more readily and it is of higher purity. Substantially increased amounts of vanillin substance and co-products are extractable. The same cyclic processes providing for reuse of products isolated according to our invention are feasible with the addition that the lime produced may also find use in the oxidizing treatment of the aqueous slurry of the sludge as described above.

It is well known that when lignin substance is subjected to alkaline oxidation under conditions in which vanillin is formed, that the formed vanillin is itself subject to oxidation in the reaction zone, and that to this extent the net vanillin yield is thereby decreased. A time of reaction should, therefore, be selected having regard to the severity of the oxidation conditions such that excessive decomposition of the formed vanillin does not occur, i.e., that a good net vanillin yield is obtained. In the practice of our invention we have generally found that the preferred reaction time is less than 2 hours and that a shorter time is preferred corresponding to more severe conditions of oxidation, such as higher temperatures, higher partial oxygen pressure, and/or higher air flow. We have also found that the net vanillin yield is more likely to be reduced due to oxidation of formed vanillin under reaction conditions corresponding to higher partial oxygen pressures. In any event the reaction becomes more difficult to control as higher partial oxygen pressures are employed. We therefore prefer to operate at partial oxygen pressures (entering the reaction zone) lower than 20 lb. per square inch and, indeed when reaction temperatures of the order of 175° and higher are employed, we prefer to employ partial oxygen pressures of less than 10 lb. per square inch. Our invention discloses that satisfactory yields of vanillin can be obtained in the general range of conditions as set out herein and the selection of preferred conditions as to severity and time of oxidation within this range may readily be ascertained by anyone who is normally skilled.

During the reaction adequate agitation of the reactants in the reaction zone is highly desirable. This agitation serves to disperse the gas containing oxygen into small bubbles and thus increase the exposure of the materials being oxidized to the gaseous oxygen content of the said gas bubbles. Agitation also maintains the solid phase in the reactor in suspension.

The above modification of this method of obtaining useful products is indicated in the diagrammatic flow sheet, FIG. 2 and its operation will be apparent from the above description.

Figure 3:
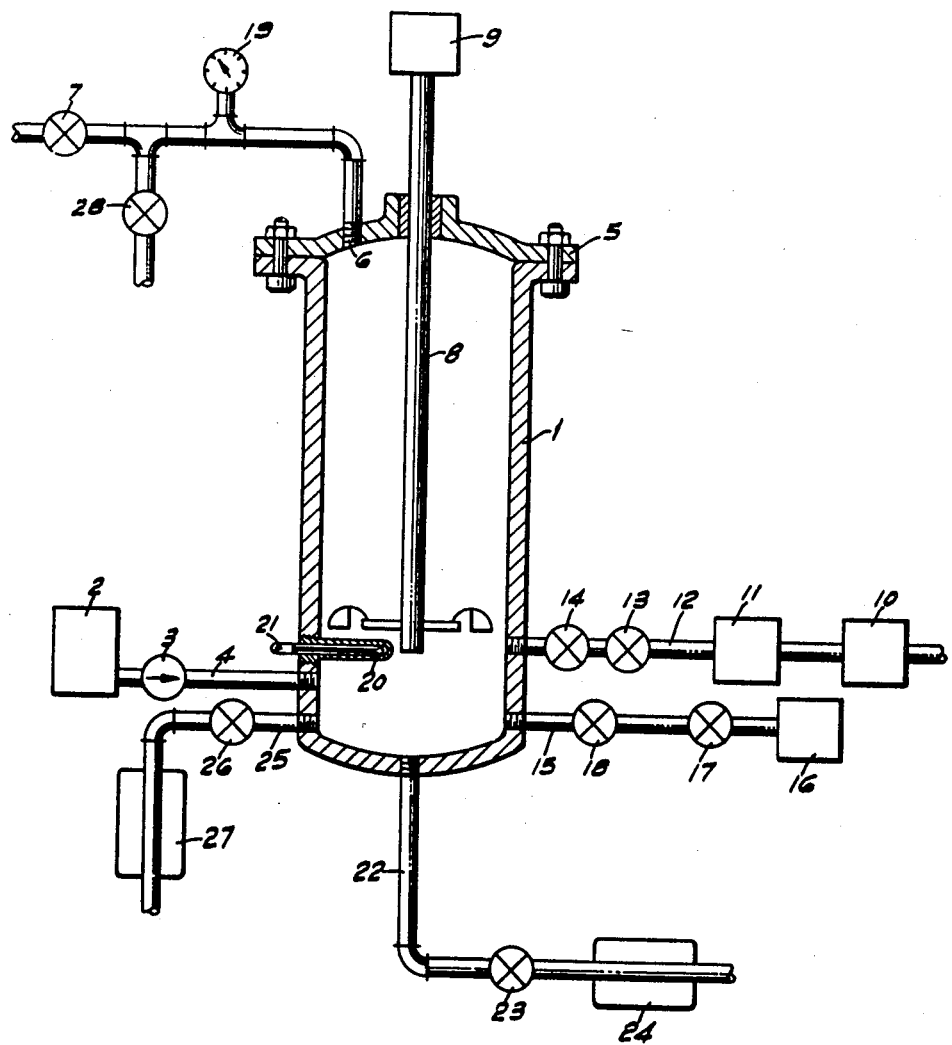
FIG. 3 shows in diagrammatic form an apparatus which may be used in practising our invention.

In practising this and other modifications of our invention which include an oxidative step we employ apparatus as illustrated in the accompanying drawing in which FIG. 3 shows in diagrammatic form an apparatus which we have used in some of our experiments comprising a reaction vessel 1 into which the reactants are introduced from the tank 2 by means of the pump 3 and pipeline 4, a cover 5 containing an opening 6 leading to a control back pressure relief valve 7 which limits the maximum pressure in the reaction system to a predetermined value and maintains the pressure thereat. The bomb contents are agitated by the agitator 8 which in FIG. 3 is shown as a turbo-mixer type. This turbo-mixer is driven by the motor 9. Compressed air is introduced from the compressor 10 through the tank 11 and the pipeline 12 into the reactor in which it is diffused by the action of the turbo-mixer 8, the pressure and rate of flow of air being regulated by the valves 13, 14.

The reaction vessel is heated by direct steaming through the pipeline 15, steam being supplied from the boiler 16 and regulated as to pressure and flow by the valves 17, 18. Other suitable heating means may, of course, be substituted. The reaction vessel is also equipped with a pressure gauge 19 and a thermometer well 20 containing a thermometer 21. The reaction vessel may be emptied through the opening 22 controlled by the valve 23 which provides for a general liquor discharge. This discharge is made through the cooler 24. There is also provided a sampling line 25 controlled by the valve 26 and discharging through the cooler 27 by means of which small samples may be withdrawn at any time. A general relief valve 28 is also provided for general pressure reduction when required.

The following experiment is illustrative of this application of our invention.

Example 2

Lignosulfonic acid materials were treated according to the process of U.S. Patent 2,576,754. The reactants were filtered and a quantity of the filter cake or sludge containing 400 grams equivalent dry solids was suspended with 240 grams of sodium carbonate and 13.2 grams of slaked lime in an aqueous slurry which was made up to a total volume of 2 litres. The above mixture was charged into a reactor such as that illustrated in FIG. 3.

The charge was heated to a temperature of 170° C. and the temperature retained thereat throughout the remainder of the treatment. Air was passed into the reactor at the rate of 15 cubic feet (S.T.P.) per hour for 40 minutes. A back pressure valve (7) was set at 155 pounds per square inch gauge so that the total pressure throughout the reaction was automatically maintained at this level. From measurement of the steam pressure and the total operating pressure, the partial oxygen pressure was estimated as being 11.4 pounds per square inch. After treatment as above the air flow was stopped, the reactor allowed to cool, and the total reaction products withdrawn. On filtering there were removed 303 grams of solid material comprising chiefly calcium carbonate. After separation the latter was calcined to produce a quick lime which on test contained 93% available lime. Filtrate after removal of the carbonate was diluted by the addition of water equal to 60% of its volume and was acidified to pH 6 and extracted with toluene, using a small amount of Oronite wetting agent "S" as a de-emulsifying agent. 6.1 grams of vanillin and 0.3 grams of acetovanillone were subsequently recovered from the toluene extract. Following extraction of the vanillin the toluene residual in the liquor was removed by stripping as in Example 1. The residual liquor was acidified with sulphuric acid to pH 4 thereby precipitating lignin substance. The latter was removed by filtration and amounted to 38 grams equivalent dry weight. The filtrate residual after lignin separation was treated with sufficient slaked lime to precipitate its oxalate content as calcium oxalate. 42 grams of calcium oxalate were so obtained. The residual liquor after removal of the calcium oxalate was evaporated to dryness and gave a residue containing about 280 grams of a mixture of sodium sulphate and sodium bisulphate.

Example 3

A series of experiments were run similar to Example 2 in which the temperature of the reaction step, the time of heating, and other variables were controlled as below.

| Reaction Temp., ° C. | Total Press., p.s.i.g. | Oxygen Partial Pressure, p.s.i. | Time of Reaction, mins. | Vanillin Produced, grams | Lignin Produced, grams |
|---|---|---|---|---|---|
| 200 | 236 | 5 | 20 | 5.9 | 42 |
| 140 | 62 | 5 | 75 | 5.4 | 52 |
| 170 | 115 | 3 | 60 | 6.3 | 62 |

In the practice of our invention the precise acidity at which lignin begins to precipitate depends on the concentration of lignin substance and also in part on the concentration of other materials since large quantities of inorganic compounds tend to salt out the lignin. In addition there is some variation between different batches of the sludge solid. Extraction of vanillin from a liquor in which precipitated lignin substance is suspended is liable to encounter such severe emulsion difficulties as to render the process substantially inoperable. It is therefore an important aspect of practising our invention that the vanillin be extracted from a liquor free of suspended lignin substance. If, under the condition of acidity desired for vanillin extraction, a precipitation of lignin substance occurs it is therefore preferable to adjust the acidity to a level of say pH 5.5 or 5.0, separate the lignin substance by filtration, and then proceed to extract the vanillin without further acidification from the filtrate following the removal of lignin substance. It will be obvious that, if sodium values are to be recovered by evaporation, excessive dilution should be avoided in order to reduce the quantity of water to be evaporated during the course of recovery of the said sodium values. Thus, the preferred operation with respect to recovery of sodium values necessitates the maintenance of a relatively high solids concentration throughout the processing steps including those of vanillin recovery and lignin recovery. Such a high concentration is favourable to lignin precipitation at a higher pH. It is, therefore, a preferred embodiment of our invention that such high concentration of solids be maintained in which case it will be preferable and indeed essential to precipitate and remove the lignin substance prior to extraction of vanillin. Nevertheless, precipitation of lignin substance prior to extraction of vanillin may be avoided by diluting the mixture so that the concentration of lignin substance is reduced to a level where it does not precipitate. Operation under such conditions, although we usually prefer to avoid them, is nevertheless to be considered within the scope of our invention.

When the lignin substance is precipitated in advance of vanillin extraction an adsorption or occlusion of vanillin occurs thereon. Recovery of such adsorbed or occluded vanillin is highly desirable and may be effected by washing the lignin substance. However, we have discovered that when the lignin substance is washed with water it tends to disintegrate and to form a slimy mass which has very poor filtering characteristics. Effective washing is, therefore, very difficult. We have discovered that adequate recovery of vanillin can be accomplished without substantial change in the form of filtering characteristics of the lignin substance if such washing is carried out with the raffinate residual after extraction of vanillin after the next following step in the process. It is probable that the use of a liquid containing the same dissolved inorganic materials as were present in the liquor from which the lignin substance was originally precipitated results in there being substantially no change in the lignin structure and we have found that this raffinate is an effective washing agent to remove adsorbed or occluded vanillin. The recovery of vanillin from lignin substance by washing with the said raffinate therefore constitutes an important preferred aspect of our invention, permitting greatly improved recovery of both vanillin and lignin substance. An additional important advantage of using raffinate to wash the lignin is that dilution of the liquors prior to any subsequent step of recovering sodium values is avoided.

Example 4

Lignosulfonic acid materials were treated according to process of U.S. Patent 2,576,754. The reactants were filtered and a quantity of the filter cake or sludge containing 400 grams equivalent dry solids was suspended with 240 grams of sodium carbonate and 13.2 grams of slaked lime in an aqueous slurry which was made up to a total volume of 2 litres. The above mixture was charged into a reactor such as that illustrated in FIG. 3.

The charge was heated to a temperature of 170° C. and the temperature retained thereat throughout the remainder of the treatment. Air was passed into the reactor at the rate of 15 cubic feet (S.T.P.) per hour for 40 minutes. A back pressure valve (7) was set at 155 pounds per square inch gauge so that the total pressure through the reaction was automatically maintained at this level. From measurement of the steam pressure and the total operating pressure, the partial oxygen pressure was estimated as being 11.4 pounds per square inch. After treatment as above the air flow was stopped, the reactor allowed to cool, and the total reaction products withdrawn. On filtering there were removed 303 grams of solid material comprising chiefly calcium carbonate. The filtrate after removal of carbonate was acidified to pH 5 with sulphuric acid. Lignin substance corresponding to 42 grams dry weight precipitated. This was removed by filtration and the filtrate then extracted with toluene using a small amount of Oronite wetting agent "S" as a de-emulsifying agent. 5.3 grams of vanillin were recovered from the toluene extract. The lignin was washed three times in each case with a volume corresponding to 10% of the liquor from which it had been precipitated with the raffinate from the toluene extraction. These washings were in turn extracted with toluene and an additional 0.6 gram of vanillin recovered therefrom. The combined raffinates from the toluene extractions were later worked up to recover calcium oxalate values and sodium values in similar fashion to the preceding examples.

The practice of our invention can also be carried out by slurrying the solid phase produced in accordance with U.S. Patents 2,576,752, 2,576,753 and 2,576,754 in an aqueous medium containing dissolved lignosulfonic acid compounds. Thus, instead of treating the solid phase with an aqueous solution of sodium carbonate, the solid phase may be treated with an aqueous solution of sodium carbonate in sulphite waste liquor or in the same liquor which has previously been treated to reduce the fermentable sugar content thereof. The liquor remaining after sulphite waste liquor has been subjected to fermentation to produce ethyl alcohol (which residual liquor is hereinafter referred to as "alcohol plant effluent") is a particularly suitable material for the application of our invention in this respect.

According to this modification of our invention useful materials are obtained both from the sludge and from the lignosulfonic acid compounds present in the alcohol plant effluent. Such lignosulfonic acid compounds are subjected to a controlled alkaline oxidation thereby producing additional vanillin. Such solid phase as is formed due to the co-presence of lime as an active alkali beomes in situ additional raw material for the process according to our invention and from such solids additional vanillin and other useful products are derivable. The quantity of alkali (sodium carbonate and lime) which is necessary to carry out the reaction has, of course, to be increased corresponding to the demands of the lignosulfonic acid materials present.

With a view to the eventual recovery of sodium values the advantage of avoiding any unnecessary or undue dilution of the reactants has been emphasized. If an attempt is made to slake lime directly in alcohol plant effluent some of the lime particles become coated with the calcium derivatives of lignosulfonic acid materials, the slaking operation is rendered difficult and there is excessive foaming. We have found that this can be avoided, if prior to the slaking operation, the required sodium carbonate is dissolved in the alcohol plant effluent. The lime is then slaked in such a solution. Such a procedure is therefore a preferred embodiment of this particular application of our invention and is strongly recommended. When sodium carbonate is dissolved in alcohol plant effluent precipitation of lignin substance may occur if either the concentration of sodium carbonate is too high or if, at a given concentration, the temperature is too high. Such precipitation is undesirable. The precise concentration of sodium carbonate at which precipitation occurs depends on the temperature and on the concentration of lignin substance in the alcohol plant effluent. In general we have found that the precipitation does not occur under conditions of slaking unless the concentration of sodium carbonate in alcohol plant effluent is greater than 3.5 lb./gal. A concentration of 3.5 lb./gal. or less is therefore recommended. In this application also precipitation and filtration of lignin substance prior to vanillin extraction is preferred for the same reasons as those given previously and again in such case the washing of the lignin precipitate to recover vanillin values by a raffinate following extraction of vanillin by an appropriate solvent, for example toluene, is preferred.

The following examples are illustrative of the practice of this modification of our invention.

*Example 5*

The solid phase residual from treatment of alcohol plant effluent in accordance with the process of U.S. Patent 2,576,754 was separated by filtration and a slurry prepared from the filter cake or sludge containing 40 pounds equivalent dry solids in 20.4 imperial gallons. 32 pounds of sodium carbonate were dissolved in 13.6 imperial gallons of alcohol plant effluent (which contained 0.88 pound solids per imperial gallon) and this solution was used to slake a quantity of quick lime sufficient to give 14 pounds slaked lime. All the above materials were charged into a reactor constructed substantially according to FIG. 3. The reactor was heated to 162° C. and air was then passed into the reactor at a rate of 600 cubic feet (S.T.P.) per hour. The total pressure in the reactor was maintained at 154 p.s.i. gauge (corresponding partial oxygen pressure 5 p.s.i.). The reaction is exothermic and the temperature rose to 180° C. becoming constant at this value. After a total reaction time of 45 minutes the air was turned off and the reactor discharged with rapid cooling of the charge. The reactants were then treated according to the methods of Example 4 resulting in the following products.

|   | Lb. |
|---|---|
| Calcium carbonate | 43.3 |
| Lignin, precipitated at pH 5 | 7.6 |
| Vanillin from initial extraction at pH 5 | 0.82 |
| Vanillin recovered by washing lignin | 0.12–0.94 |
| Calcium oxalate | 4.0 |
| Sodium sulphate | 44.0 |

*Example 6*

A series of experiments was run similar to Example 5 in which the reaction variables were as below:

| Reaction Temp., ° C. | Total Press., p.s.i.g. | Oxygen Partial Pressure, p.s.i. | Time of Reaction, mins. | Vanillin Produced, lbs. | Lignin Produced, lbs. |
|---|---|---|---|---|---|
| 140 | 62 | 5 | 80 | 0.75 | 8.0 |
| 200 | 236 | 5 | 20 | 0.97 | 9.2 |
| 180 | 136 | 1 | 50 | 1.02 | 9.7 |

*Example 7*

An experiment was run similar to Example 5 in which reaction temperature was 140° C., total pressure 62 p.s.i., rate of air flow passing to the reactor 350 cubic feet (S.T.P.) per hour, and the corresponding partial oxygen pressure 5 p.s.i., the time of reaction 125 minutes, the vanillin produced 0.70 pound, and the lignin produced 8.0 pounds.

It will be apparent that cyclic processes employing lime prepared from calcium carbonate recovered in accordance with our invention, and that cyclic processes for the use of sodium carbonate when sodium values are recovered in this form are applicable in the above modification of our invention no less than in the preceding examples cited.

In the examples given as illustrative of the process according to our invention the separation of a number of useful products has been described. It will be obvious that one or more of such useful products will in fact be separated as determined by economic considerations and that it is not technically necessary that the complete process according to our invention as disclosed be followed in every instance. For example, if sodium values are to be recovered by evaporation and pyrolysis in the form of sodium carbonate the step of oxylate separation is not necessary. The separation of lignin is similarly necessary only if vanillin values are to be recovered and other conditions are such that lignin precipitation occurs at the pH selected for vanillin extraction. Means for avoiding such precipitation have been indicated.

When in the examples above set out we refer to "gallons" we mean imperial gallons.

When in this specification the word "pressure" is used it is to be understood that we refer to gauge pressure and not absolute pressure.

When in the claims we refer to the use of a pH of 12 or greater, we have reference to the determination of the pH of a liquor sample withdrawn from the reactor and then cooled to room temperature when determined according to the methods described herein.

When in the specification and claims we use the expression "lignosulfonic acid compounds" we mean thereby materials derived from lignin when so treated that sulfonic acids are formed therefrom, e.g., when lignin-containing substances are subjected to the sulphite pulping process, and including salts of the said sulfonic acids. Thus we specifically include sulphite waste liquor and such liquor which has been previously treated to reduce the fermentable sugar content thereof, but we exclude materials derived from lignosulfonic acid compounds in such manner as to effect a substantial or complete desulfonation thereof. Thus, we specifically exclude the ligneous portion of the solid phase residual from alkaline oxidation of lignosulfonic acid compounds, e.g., when the said alkaline oxidation has been carried out in the presence of lime as the active alkali.

When in the specification and claims we use the expression "raffinate residual from the extraction of vanillin" we mean and have reference to the aqueous liquor discharged from an extractor, e.g., such as if referred to as numeral 6 in FIG. 1 and numeral 9 in FIG. 2 of the drawings, in which vanillin has been removed from solution by a solvent relatively immiscible with water.

What we claim as our invention is:

1. A process for the recovery of vanillin from the solid phase residual from the alkaline oxidation of lignosulphonic acid compounds, said alkaline oxidation having been carried out in the presence of lime as the active alkali, said solid phase residual comprising the calcium derivative of vanillin, the calcium derivative of substantially desulphonated lignosulphonic acid, calcium oxalate, calcium sulphate and calcium carbonate, which comprises mixing the said solid phase residual with an aqueous solution of sodium carbonate to convert the aforementioned calcium derivatives other than calcium carbonate to the corresponding soluble sodium derivatives, separating the insoluble calcium carbonate from said aqueous solution, acidifying said aqueous solution to precipitate lignin substance, separating said lignin substance therefrom, and extracting the resultant aqueous solution with a solvent to recover vanillin originally present as the calcium derivative of vanillin in said solid phase residual.

2. A process for the recovery and production of vanillin from the solid phase residual from the alkaline oxidation of lignosulphonic acid compounds, said alkaline oxidation having been carried out in the presence of lime as the active alkali, said solid phase residual comprising the calcium derivative of vanillin, the calcium derivative of substantially desulphonated lignosulphonic acid, calcium oxalate, calcium sulphate and calcium carbonate, which comprises mixing said solid phase residual with an aqueous solution containing sodium carbonate and lime, heating the resultant mixture in a reaction zone to a temperature not less than 120° C., nor more than 200° C., maintaining said zone under super-atmospheric pressure, continuously passing a gas containing free gaseous oxygen in finely dispersed form through said reaction zone and continuously removing residual gas, the rate of addition and removal of said gas being such as to maintain a partial pressure of oxygen in said zone of less than 20 lb. per square inch, sodium carbonate being initially present in the material introduced into the reaction zone in an amount equivalent to the calcium content of said solid phase residual, diminished by the calcium present as calcium carbonate in said solid phase residual, and the amount of lime so present being sufficient to react with the carbonate formed in the reaction, plus an additional amount of lime and sodium carbonate which, in combination, maintain the pH of the reaction mixture (determined on a sample withdrawn from the reaction zone and cooled to room temperature) at not less than 12, the time of said reaction being less than four hours, withdrawing said reaction mixture from said reaction zone, clarifying said reaction mixture by separating the insoluble calcium carbonate from said reaction mixture, acidifying the clarified reaction mixture to precipitate lignin substance, separating said lignin substance therefrom, and extracting the resultant clarified liquor with a solvent to recover vanillin originally present as the calcium derivative of vanillin in said solid phase residual and to recover additional vanillin produced in said reaction zone.

3. A process according to claim 2 wherein said aqueous solution contains lignosulphonic acid compounds.

4. A process for the recovery of vanillin from the solid phase residual from the alkaline oxidation of lignosulphonic acid compounds, said alkaline oxidation having been carried out in the presence of lime as the active alkali, said solid phase residual comprising the calcium derivative of vanillin, the calcium derivative of substantially desulphonated lignosulphonic acid, calcium oxalate, calcium sulphate and calcium carbonate, which comprises mixing the said solid phase residual with an aqueous solution of sodium carbonate to convert the aforementioned calcium derivatives other than calcium carbonate to the corresponding soluble sodium derivatives, separating the insoluble calcium carbonate from said aqueous solution, extracting the resultant aqueous solution with a solvent to extract vanillin in the form of its sodium derivative, such vanillin having been originally present as the calcium derivative of vanillin in said solid phase residual, and subsequently recovering said vanillin from said solvent.

References Cited in the file of this patent

UNITED STATES PATENTS

| | | |
|---|---|---|
| 2,057,117 | Sanborn et al. | Oct. 13, 1936 |
| 2,069,185 | Hibbert et al. | Jan. 26, 1937 |
| 2,140,375 | Allen | Dec. 13, 1938 |
| 2,399,607 | Servis | Apr. 30, 1946 |
| 2,419,020 | Hales | Apr. 15, 1947 |
| 2,576,752 | Fisher et al. | Nov. 27, 1951 |
| 2,692,291 | Bryan | Oct. 19, 1954 |
| 2,913,310 | Sanborn et al. | Nov. 17, 1959 |
| 2,928,868 | Grangaard | Mar. 15, 1960 |

FOREIGN PATENTS

| | | |
|---|---|---|
| 470,916 | Canada | Jan. 16, 1951 |

OTHER REFERENCES

Khim. Nauka i Prom., 2, No. 4, pages 462–465 (1957), "The Production of Vanillin From Lignosulfonates," by O. D. Kamaldina.